(12) United States Patent
Miller et al.

(10) Patent No.: US 7,810,646 B2
(45) Date of Patent: Oct. 12, 2010

(54) AIR SEPARATION OF RECYCLABLE MATERIAL

(75) Inventors: Steve Miller, Eugene, OR (US); Roy Miller, Eugene, OR (US)

(73) Assignee: Emerging Acquisitions, LLC, Eugene, OR (US)

( * ) Notice: Subject to any disclaimer, the term of this patent is extended or adjusted under 35 U.S.C. 154(b) by 0 days.

(21) Appl. No.: 12/348,676

(22) Filed: Jan. 5, 2009

(65) Prior Publication Data

US 2009/0114571 A1   May 7, 2009

Related U.S. Application Data

(63) Continuation of application No. 11/556,582, filed on Nov. 3, 2006, now Pat. No. 7,584,856.

(51) Int. Cl.
B07B 4/00 (2006.01)
B07B 7/00 (2006.01)

(52) U.S. Cl. .............. 209/139.1; 209/132; 209/133; 209/142; 209/147

(58) Field of Classification Search ........... 209/132, 209/133, 139.1, 142, 147
See application file for complete search history.

(56) References Cited

U.S. PATENT DOCUMENTS

| | | | | |
|---|---|---|---|---|
| 1,913,876 A * | 6/1933 | Frederick | ........................ | 209/2 |
| 3,738,483 A | 6/1973 | MacKenzie | | |
| 3,788,568 A | 1/1974 | Marsh | | |
| 3,873,033 A * | 3/1975 | Tilby | ............................ | 241/19 |
| 4,155,602 A | 5/1979 | Quick | | |
| 4,377,401 A | 3/1983 | Laughlin | | |
| 4,798,508 A * | 1/1989 | Lewis | ........................ | 414/412 |
| 4,853,112 A | 8/1989 | Brown | | |
| 4,915,824 A | 4/1990 | Surtees | | |
| 5,025,929 A * | 6/1991 | Carrera | ........................ | 209/19 |
| 5,074,992 A | 12/1991 | Clinton | | |
| 5,344,025 A | 9/1994 | Tyler | | |
| 5,361,909 A * | 11/1994 | Gemmer | .................... | 209/12.1 |
| 5,484,247 A | 1/1996 | Clark | | |
| 5,967,333 A | 10/1999 | Smith | | |
| 6,079,929 A * | 6/2000 | Muma et al. | ................ | 414/412 |
| 6,089,814 A | 7/2000 | Bayer | | |
| 6,110,242 A * | 8/2000 | Young | ........................ | 55/337 |
| 6,149,018 A * | 11/2000 | Austin et al. | ................ | 209/672 |
| 6,250,472 B1 | 6/2001 | Grubbs | | |

OTHER PUBLICATIONS

Nihot, Solutions in air-controlled separation, the Nihot Windshifter, Catalog.
Nihot, Sort it out with air, the Nihot Drum Separators, Catalog.

* cited by examiner

*Primary Examiner*—Gene Crawford
*Assistant Examiner*—Terrell H Matthews
(74) *Attorney, Agent, or Firm*—Stolowitz Ford Cowger LLP

(57) ABSTRACT

A separation system includes an air separator that in one embodiment primarily receives Municipal Solid Waste (MSW) containing relatively light MSW recyclable materials such as paper, cardboard, plastic containers, and/or metal containers. The air separator blows the relatively light MSW recyclable materials up though a chamber and onto a first conveyer while the other relatively heavy MSW material drops down a chute onto a second conveyer. A separation screen receives the relatively light MSW recyclable materials from the air separator and separates the relatively flat paper and cardboard from the plastic and metal containers.

23 Claims, 7 Drawing Sheets

AIR SEPARATION OF RECYCLABLE MATERIAL

This application is a continuation of U.S. application Ser. No. 11/556,582, filed Nov. 3, 2006, which is herein incorporated by reference in its entirety.

BACKGROUND OF THE INVENTION

1. Field of the Invention

This invention relates to separating various recyclable materials from Municipal Solid Waste (MSW).

2. Description of the Related Art

Disc or roll screens are frequently used as part of a multi-stage material separating system. Disc screens are used in the materials handling industry for screening large flows of materials to remove certain items of desired dimensions. In particular, disc screens are used for classifying what is normally considered debris or residual materials. This debris may consist of soil, aggregate, asphalt, concrete, wood, biomass, ferrous and nonferrous metal, plastic, ceramic, paper, cardboard, or other products or materials recognized as debris throughout consumer, commercial and industrial markets. The function of the disc screen is to separate the materials fed into it by size. The size classification may be adjusted to meet different applications.

Disc screens generally have a screening bed having a series of rotating spaced parallel shafts, each of which has a longitudinal series of concentric screen discs separated by spacers which interdigitate with the screen discs of the adjacent shafts. The relationship of the discs and spacers on one shaft to the discs and spacers on each adjacent shaft form an opening generally known in the industry as the InterFacial Opening or "IFO". The IFOs permit only material of acceptable size to pass downwardly through the rotating disc bed. The acceptable sized material which drops through the IFO is commonly referred to in the industry as "accepts" or "unders".

The discs are all driven to rotate in a common direction from the infeed end of the screen bed to the outfeed or discharge end of the bed. Thus, materials which are larger than the IFO, referred to in the industry as "overs", will be advanced on the bed to the outfeed end of the bed.

It may be desirable to separate certain types of recyclable Municipal Solid Waste (MSW) from other types of recyclable or non-recyclable waste. For example, recyclable MSW materials may include paper, old corrugated cardboard (OCC); and plastic, aluminum, steel, and glass containers. These recyclable materials may need to be separated from other types of waste that may include wood, concrete, rocks, etc. However, the recyclable MSW paper, cardboard, and containers may have sizes and/or shapes similar to other types of MSW waste. Thus, existing disc screen systems that separate materials solely according to size may not effectively separate certain MSW recyclable materials.

SUMMARY OF THE INVENTION

A separation system includes an air separator that, in one embodiment, primarily receives Municipal Solid Waste (MSW) containing a mixture of relatively light MSW recyclable materials such as paper, cardboard, plastic containers, and/or metal containers and relatively heavy MSW such as textiles, food waste, yard debris, etc. The air separator blows the relatively light MSW recyclable materials up though a chamber and onto a first conveyer while the other relatively heavy MSW material drops down a chute onto a second conveyer. A separation screen receives the relatively light MSW recyclable materials from the air separator and separates the relatively flat paper and cardboard from the plastic and metal containers.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Recyclable Municipal Solid Waste (MSW) materials include, but are not limited to, fiber material such as newspaper, mixed paper, Old Corrugated Cardboard (OCC), other cardboard and office paper products. Recyclable MSW can also include relatively light plastic containers, aluminum containers, tin containers and other metal containers or shapes. The material in all of these MSW recyclable items are used for making new products that may use the same material as the recycled items. For example, the paper and cardboard fiber material is re-pulped to make new paper, cardboard, or other fiber products. The recyclable MSW PolyEthylene Terephthalate (PET), High Density PolyEthylene (HDPE), PolyVinyl Chloride (PVC), or other plastic containers are shredded and melted into new containers and any other types of plastic products that may not be related to the original recovered product. For example, PET bottles can be used as fiber fill for winter jackets or as fill for mattresses. The recyclable MSW metal containers are separated out for the purpose of making new aluminum, tin, or steel products.

Figure 1:
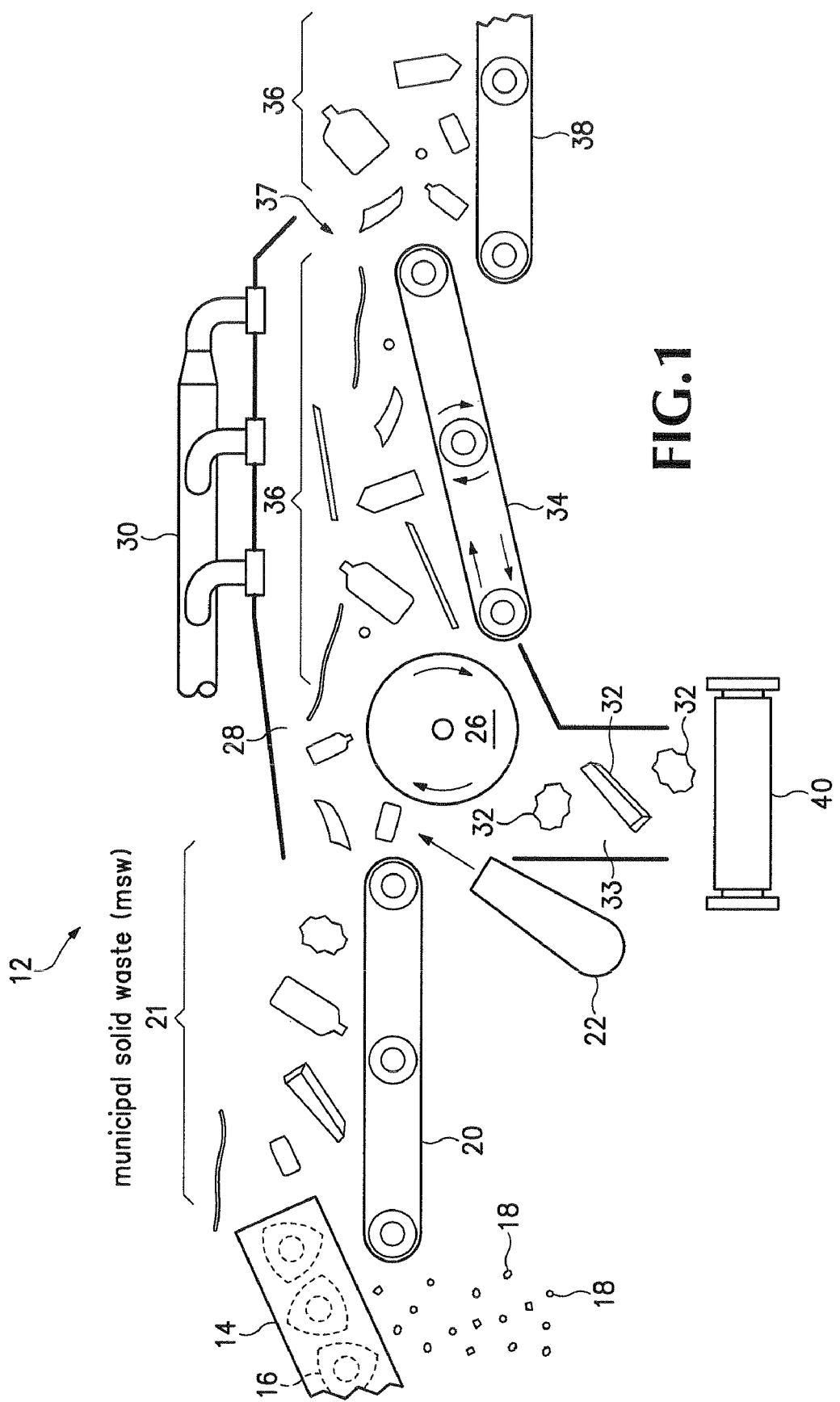
FIG. 1 is a side view of an air separator used for separating recyclable Municipal Solid Waste (MSW) materials from other MSW material.
Figure 2:
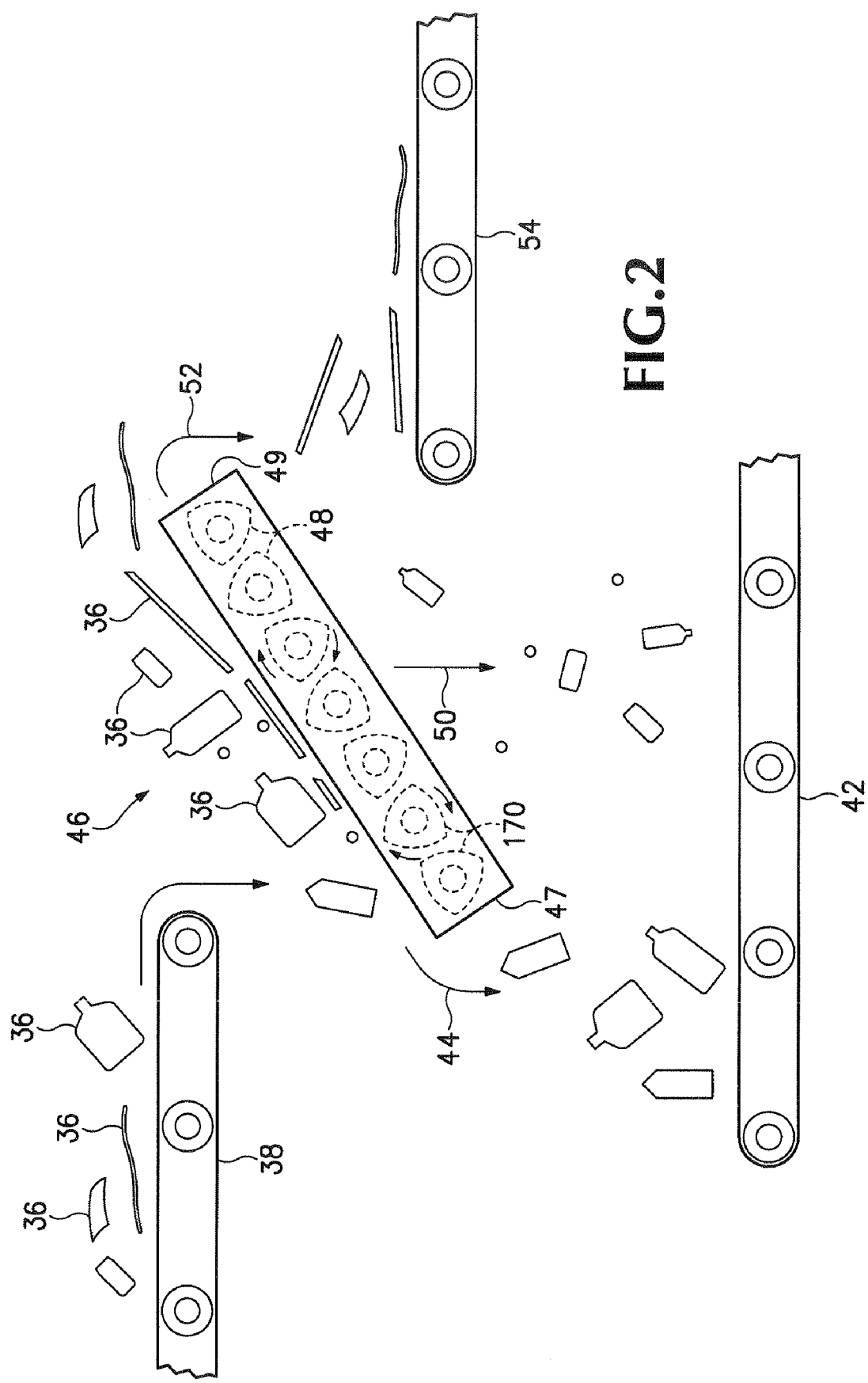
FIG. 2 is a side schematic view of a separation screen used for further separating the MSW recyclable materials output from the air separator shown in FIG. 1.

A separation system separates out the recyclable MSW materials from other MSW material and then separates the recyclable MSW fiber materials from the recyclable MSW plastic and metal containers. FIG. 1 shows an air separator 12 that separates out recyclable MSW materials 36 from other MSW material 32. FIG. 2 shows a separation screen 46 that separates the relatively flat recyclable MSW paper and cardboard fiber materials from recyclable MSW containers.

Referring first to FIG. 1, the air separator 12 includes an air chamber 28 that receives MSW 21 from a conveyer 20. In one embodiment, the MSW 21 is the waste typically retrieved from residential and office trash containers and bins. For example, the MSW 21 includes, but is not limited to, food, bottles, paper, cardboard, jars, wrappers, bags, other food containers, or any other items that may be thrown away in a home or office.

A fan 22 pulls relatively light recyclable MSW 36 over the top of a drum 26 into the air chamber 28 and onto a conveyer 34. This is accomplished by taking more air out of the air chamber 28 than is returned by the fan 22. Heavier MSW waste 32 falls down chute 33 onto a conveyer 40. In one embodiment, the drum 26 rotates to help carry the lighter recyclable MSW items 36 over drum 26 and onto conveyer 34. The recyclable MSW items 36 are carried up through air chamber 28, out opening 37, and dropped onto a conveyer 38.

The light recyclable MSW materials 36 may include newspaper, junk mail, office paper products, cardboard; plastic bottles, jugs, and other plastic containers; and aluminum, tin, or steel cans and other metal containers. The light materials 36 might also include plastic film.

The heavier MSW material 32 can include rocks, concrete, food waste, wood, or any other type of material that has a relatively heavier weight than the recyclable MSW materials 36. Alternatively, some of the MSW material 32 may have weights comparable with the weight of the lighter recyclable MSW items 36. However, the combination of weight and a relatively small surface area may prevent sufficient air pressure to be produced underneath some of the materials 32, preventing these materials from being blown into air chamber 28. These items also fall down through chute 33 onto conveyer 40.

There may be some recyclable items in heavy MSW 32. However, the majority of the recyclable MSW items 36 referred to above that include paper and cardboard fiber materials and relatively light plastic and metal containers are typically blown over drum 26 and carried by conveyer 34 through air chamber 28 and out the opening 37.

The air flow inside of chamber 28 promotes the movement and circulation of the lighter recyclable MSW items 36 over the top of drum 26 and out of the opening 37. The fan 22 can be connected to air vents 30 located on the top of chamber 28 in a substantially closed system arrangement. The fan 22 draws the air in air chamber 28 back out through air vents 30 and then re-circulates the air back into air chamber 28. A percentage of the air flow from fan 22 is diverted to an air filter (not shown). This recycling air arrangement reduces the air-pressure in air chamber 28, further promoting the circulation of light recyclable MSW materials 36 over drum 26 and out opening 37.

The negative air arrangement of the air recirculation system can also confine dust and other smaller particulates within the air chamber 28 and air vents 30. A filter (not shown) can further be inserted at the discharge of fan 22 such that a percentage of the air from the fan is diverted to a filter (not shown) to further remove some of the dust generated during the recycling process.

Current air separation systems only separate non-recyclable materials used for shredding and burning from other heavier materials. For example, air separation systems have been used for separating wood from other non-burnable materials such as concrete, rocks, and metal. MSW recyclable materials are already separated out prior to being fed into air separation systems.

Referring to FIG. 2, the light recyclable MSW items 36 are carried along conveyer 38 and dropped onto a separation screen 46. In one embodiment, the separation screen 46 includes dual-diameter discs 170 arranged to form particular openings between adjacent disc rows. The discs 140 have arched shapes that when rotated both move the items 36 up the screen 46 while at the same time vibrating the light items 36 up and down in a vertical direction. However, other types of separation screens can also be used.

The combination of gravity, the upwardly inclined angle of separation screen 46, and the shape, arrangement and rotation of discs 170, cause some of the light recyclable MSW items 44 to fall back down over a bottom end 47 of separation screen 46 onto a conveyer 42. Typically, these MSW recyclable items 44 include containers such as milk jugs, plastic bottles, beer cans, soda cans, or any other type of container having a shape and large enough size to roll backwards off the bottom end 47 of screen 46.

Other recyclable MSW items 50 drop through openings (IFO's) formed between the discs 170 while being carried up separation screen 46. The items 50 falling through the openings in separation screen 46 also fall onto conveyer 42 and typically also include plastic and metal containers. For example, the items 50 may be smaller volume containers. In one embodiment, the opening is 2"×2" but can be larger or smaller depending on the screen design.

The remaining recyclable MSW items 52 are carried over a top end 49 of separation screen 46 and dropped onto a conveyer 54. The recyclable MSW items 52 often include items with relatively flat and wide surface areas such as paper, cardboard, flattened containers, and other types of fiber materials. These relatively flat recyclable MSW items have less tendency to topple backwards over the bottom end 47 of separation screen 46 and, further, have a wide enough surface area to travel over the openings between discs 170.

Thus, the combination of the air separator 12 in FIG. 1 and the screen separator 46 in FIG. 2 first separate relatively light recyclable MSW items 36 from other MSW material 32 (FIG. 1) and then further separate the recyclable MSW plastic and metal containers 44 and 50 from the recyclable MSW paper and cardboard fiber material 52 (FIG. 2).

Referring briefly back to FIG. 1, another separation screen 14, trommel, or some other type of separation system is used for removing small items from the MSW 21. In one embodiment, the screen 14 includes discs 16 arranged to form openings of the same or various sizes that allow smaller materials 18, alternatively referred to as "fines", to drop through the screen 14. These smaller materials 18 can include small rocks, dirt, etc., that might otherwise be blown against different parts of the air separator 12 possibly damaging, or at the least, increasing the wear and tear on the air separator 12.

Figure 3:
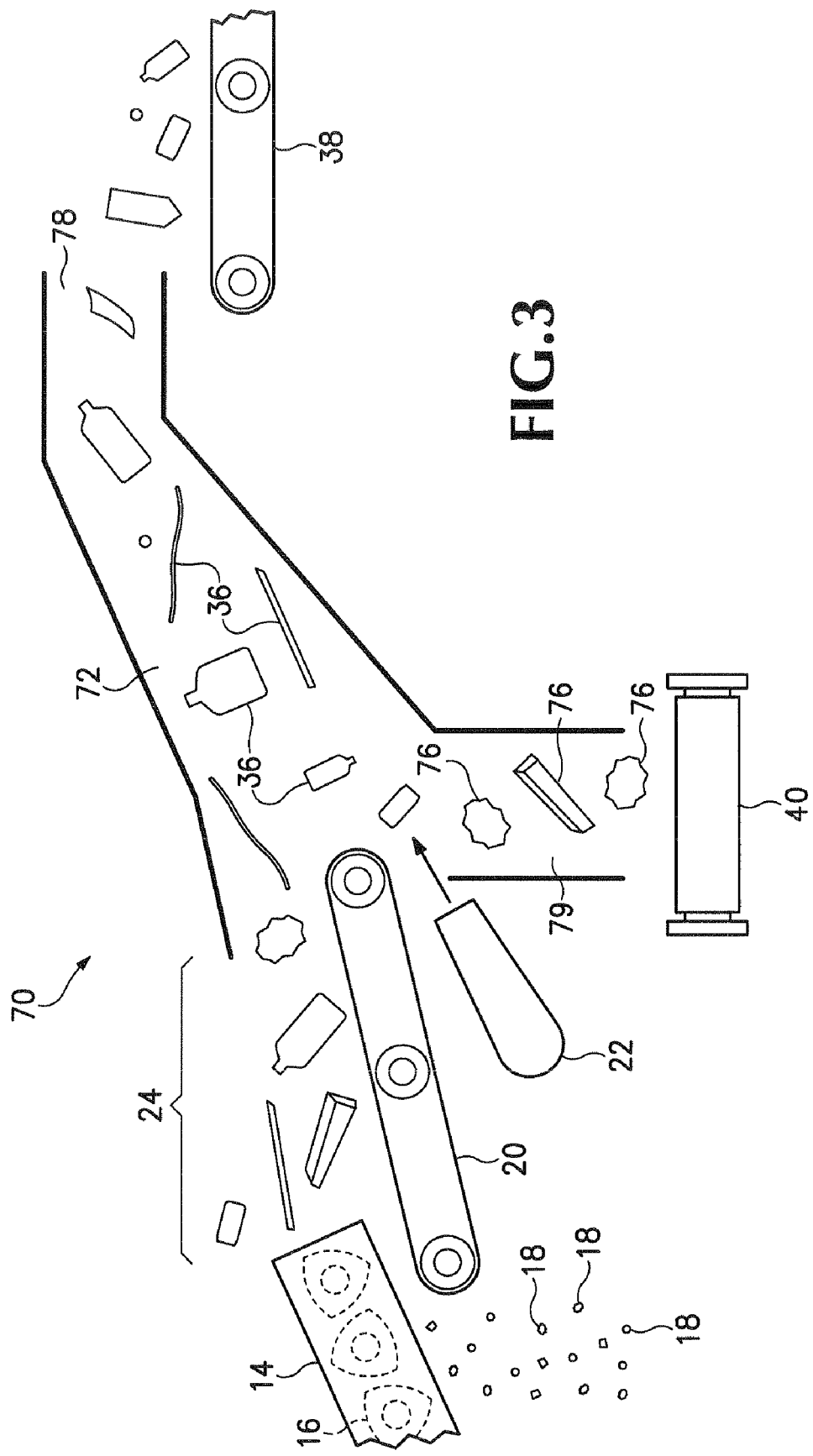
FIG. 3 is an alternative embodiment of the air separator.

FIG. 3 shows an alternative embodiment of the air separator. An air separator 70 does not use a drum and relies solely on the air pressure generated by fan 22 to pull the light recyclable MSW materials 36 through air chamber 72, out opening 78, and onto conveyer 38. The heavier MSW materials 76 fail down chute 79 onto conveyer 40.

Bag Breaker

Figure 4:
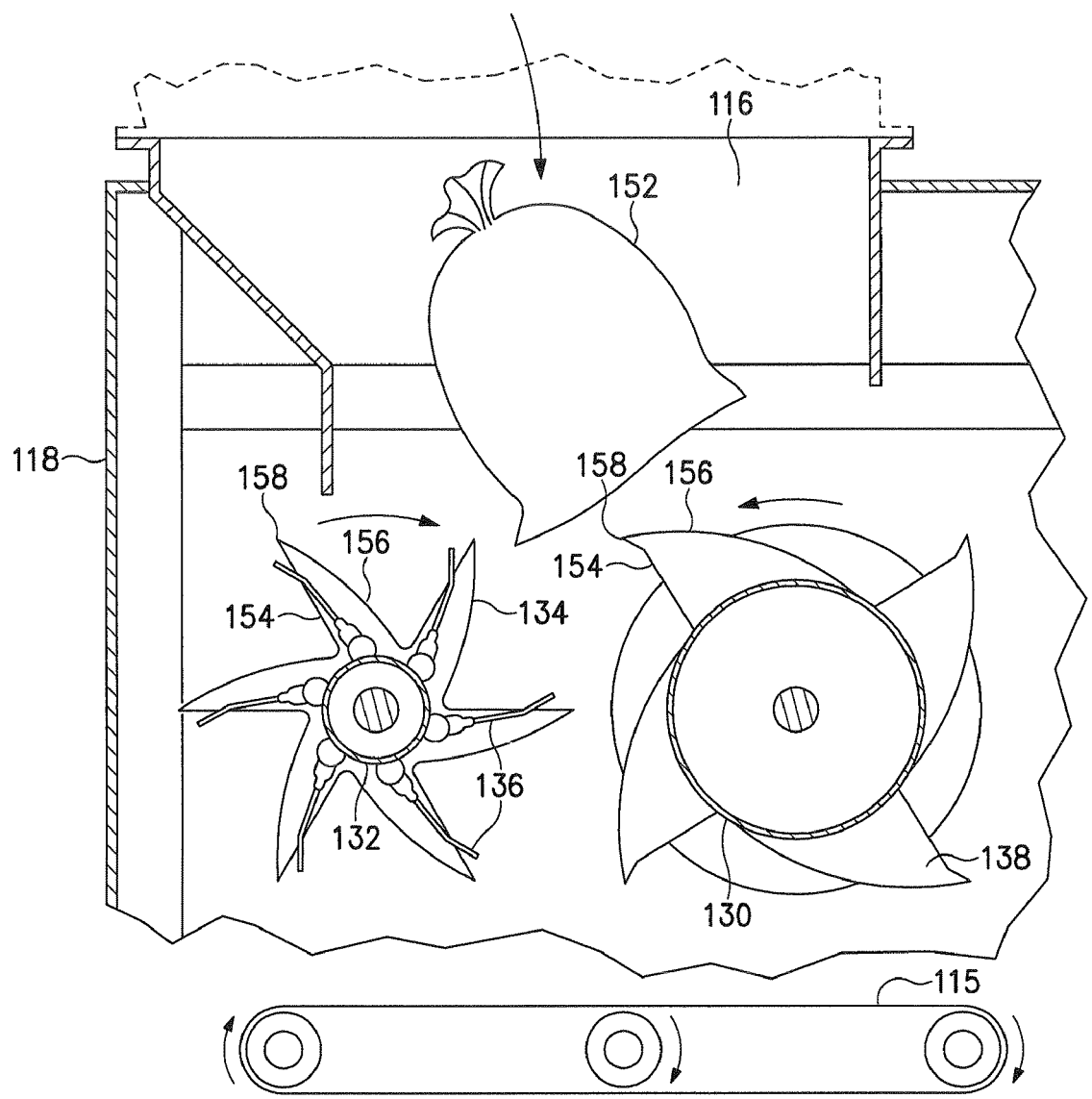
FIGS. 4 and 5 show side sectional views of a bag breaker that can be used in combination with the air separators and separation screen shown in FIGS. 1-4.

The air separation systems shown in FIGS. 1-3 can be combined with a bag breaker system shown in part in FIG. 4. The bag breaker is described in detail in U.S. Pat. No. 5,484,247, which is herein incorporated by reference.

FIG. 4 shows a partial front section view showing cylinders 132 and 130 prior to receiving a plastic bag 152. The fins 134 and 138 are spaced radially about cylinders 132 and 130, respectively. Both fins 134 and 138 each comprise a first side 154 extending substantially perpendicular from the cylinder up to a fin tip 158. A second concaved side 156 extends from a substantially tangential relationship with the cylinder up to the fin tip 158. The first and second sides of each fin 138 on cylinder 130 are shaped in substantially the same manner on the fins 134 on cylinder 132 except that the concaved side on fins 134 are sloped at a greater angle.

Each fin on cylinder 130 has a tip 158 with a radius of approximately ³/₁₆ths inches. Each fin 134 and 138 is approximately between one inch and one and one-half inches thick. A motor rotates cylinder 132 in a clockwise direction and the same or another motor rotates cylinder 130 in an opposite counter clockwise direction.

After traveling along a conveyer (not shown), bag 152 is deposited through receiving chute 116 onto the top of fins 134 and 138. The shape, thickness and rotational speed of the fins allow the bag 152 to be ripped open as opposed to being shred open. For example, if too thin, the fins will slice bag 152 into a net and not allow all the trash in the bag to fall out. In addition, if bag 152 is shredded, little pieces of the bag will drop onto the conveyer 115 making separation of the bag 152 from the other trash difficult. Cylinder 132, in one embodiment, is rotated at between 2-10 RPMs and cylinder 30 is rotated up to six times faster than cylinder 132.

Upon falling into chute 116, bag 152 is hooked by fins 134. Fins 134 serve to slow the speed of bag 152 while descending through chute 116. The clockwise rotation of fins 134 move bag 152 to the right and downward, presenting the bag to fins 138.

The second set of fins 138 rotate in a counter clockwise direction with tip 158 angled toward bag 152. Tip 158 hooks into a second location on bag 152. The relatively blunt tip 158 on fins 138 hooks into bag 152 without slicing through the plastic material. Cylinder 130 is rotated at a substantially greater speed than cylinder 132. Thus, fins 138 pull down on bag 152 much faster than fins 134 allow a portion of bag 152 to descend. Thus, fins 138 and 134 stretch apart different locations of bag 152 until the bag 152 eventually tears open.

Figure 5:
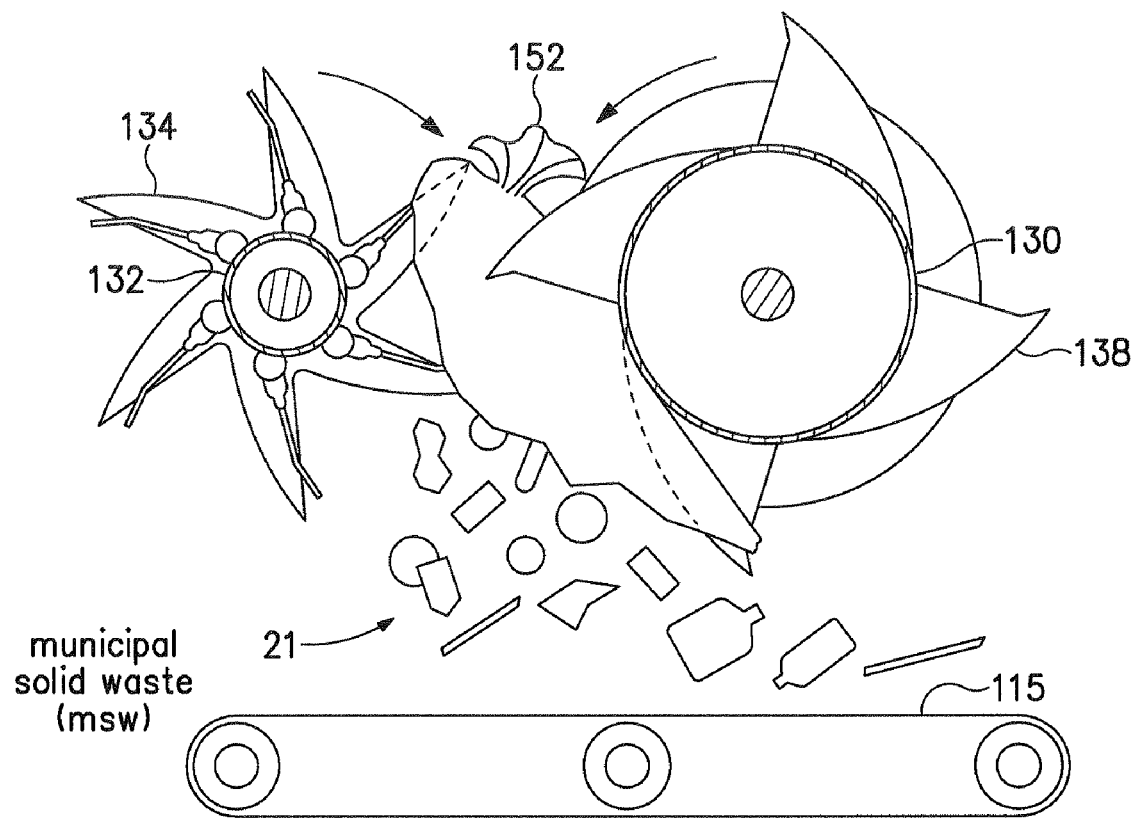

Referring to FIG. 5, fins 134 and 138 stretch the plastic bag 152 until a large tear is created that allows all the trash 21 to fall out. Cylinders 130 and 132 are spaced a sufficient distance apart so that the bottles, cans and other Municipal Solid Waste (MSW) 21 can fall between the two cylinders onto conveyer 115. Because the bag 152 is torn and not shredded, the bag often remains in substantially one piece.

The MSW 21 is carried by the conveyer 115 to the screen 14 previously shown in FIG. 1. The unique combination of the bag breaker shown in FIGS. 4 and 5 with the air separation system described above in FIGS. 1-3 allow the MSW 21 to first be automatically removed from plastic bags, then the light recyclable MSW materials separated from other MSW material, and finally the recyclable fiber material to be separated from recyclable containers.

Compound Discs

Figure 6C:
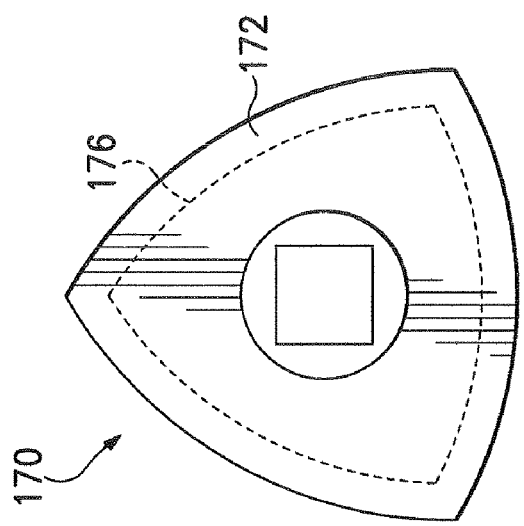
FIGS. 6A-6C show a front view, side view and perspective view, respectively, of a compound dual-diameter disc that can be used in the separation screen shown in FIG. 2.
Figure 6B:
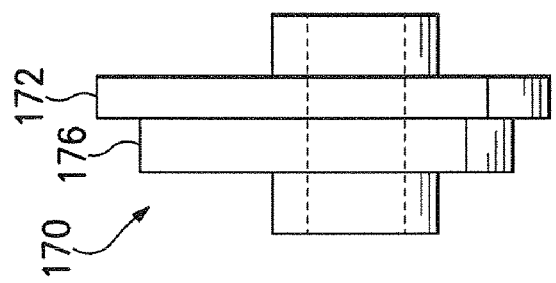
Figure 6A:
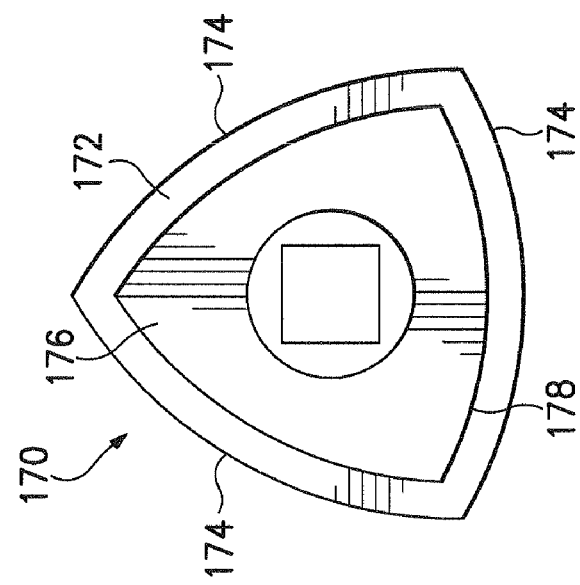

FIGS. 6A-6C show the compound disc 170 from FIG. 2 in more detail and includes a primary disc 172 having three arched sides 174. A secondary disc 176 extends from a side face of the primary disc 172 and also has three arched sides 178. The outside perimeter of the secondary disc 176 is smaller than the outside perimeter of the primary disc 172 and in one embodiment is approximately twice as wide as the width of primary disc 172. The compound disc 170 is described in U.S. Pat. No. 5,960,964, which is herein incorporated by reference.

During rotation, the arched shape of the primary disc 172 and the secondary disc 176 maintain a substantially constant spacing with similar shaped discs on adjacent shafts. However, the different relative size between the primary disc 172 and the secondary disc 176 eliminate secondary slots that normally exist between adjacent shafts. In one embodiment, the compound disc 170 is made from a unitary piece of rubber. The rubber material grips onto certain types and shapes of materials providing a more effective screening process.

Figure 7:
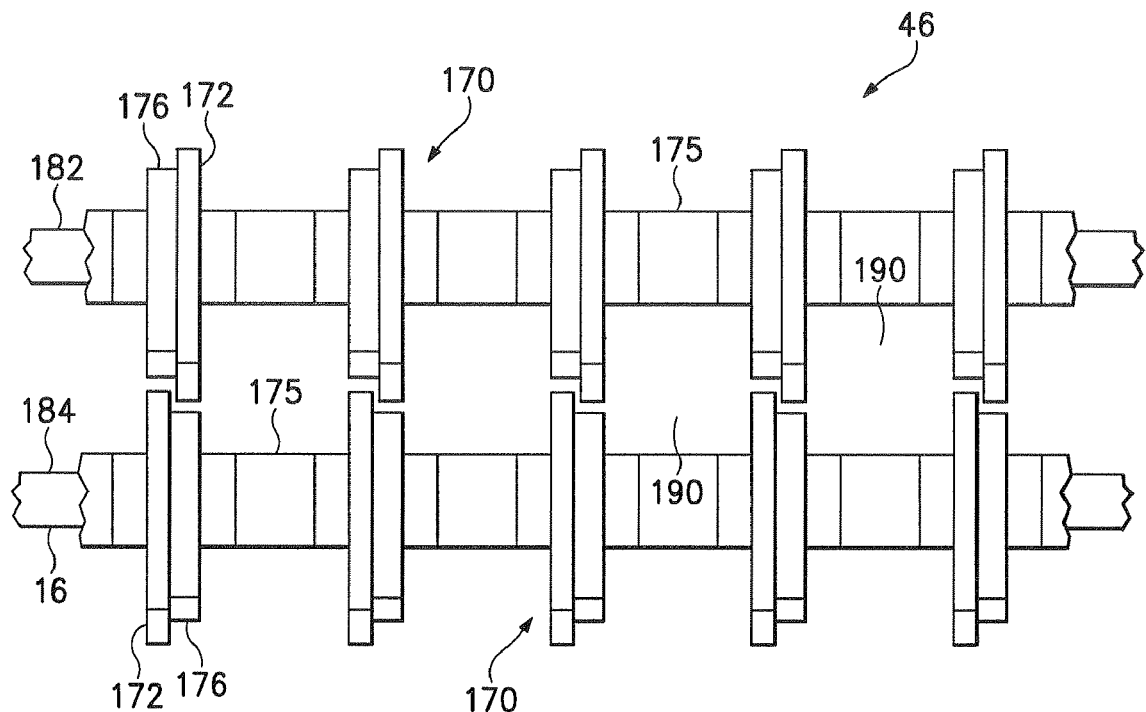
FIG. 7 is a top plan view of a separation screen section using the compound disc shown in FIGS. 6A-6C.

FIG. 7 shows a portion of the screen 46 previously shown in FIG. 2 and includes a first shaft 182 and a second shaft 184 mounted to a frame (FIG. 2) in a substantially parallel relationship. A set of primary discs 172 and associated secondary discs 176 are mounted on the first shaft 182 and separated by spacers 175. A second set of primary discs 172 are mounted on the second shaft 184 in lateral alignment on shaft 184 with secondary discs 176 on the first shaft 182. Secondary discs 176 mounted on the second shaft 184 are aligned laterally with the primary discs 172 on the first shaft 182.

The primary discs 172 on the first shaft 182 and the secondary discs 176 on the second shaft 184 maintain a substantially constant spacing during rotation. The secondary discs 176 on the first shaft 182 and the primary discs 172 on the second shaft 184 also maintain a substantially constant perimeter spacing during rotation.

The alternating alignment of the primary discs 172 with the secondary discs 176 both laterally across each shaft and longitudinally between adjacent shafts eliminate the rectangular shaped secondary slots that would normally extend laterally across the entire width of the screen 46 between discs on adjacent shafts. Since large thin materials, such as paper and cardboard can no longer unintentionally pass through these secondary slots, these materials can be carried along the screen 46 and deposited in the correct location with other recyclable MSW fiber materials.

The compound discs 170 are shown as having a triangular profile with arched sides. However, the compound discs can have any number of sides, such as four sides or five sides, and any shape. In one embodiment, the primary disc 172 and the associated secondary disc 176 are formed from the same piece of rubber. However, the primary discs and associated secondary discs can also be formed from separate pieces of rubber. The primary and secondary discs may also be formed from a unitary piece of metal or from separate nieces of metal.

Figure 8:
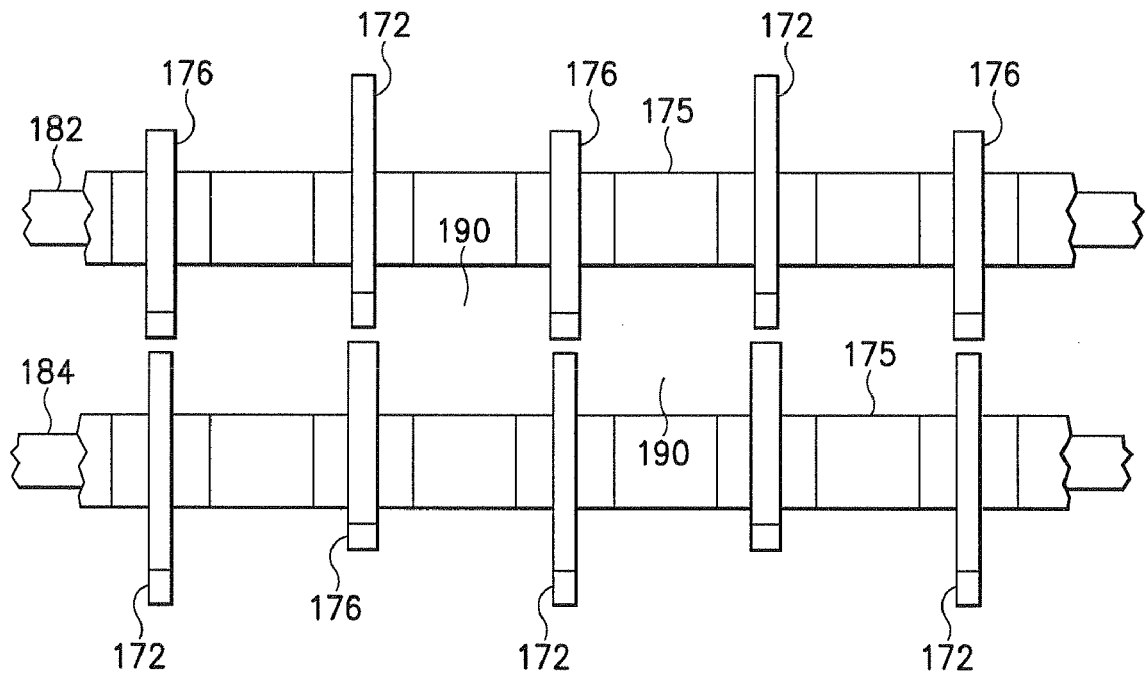
FIG. 8 is a top plan view of a separation screen section using the compound disc shown in FIGS. 6A-6C according to another embodiment.

FIG. 8 shows an alternative embodiment of the dual diameter disc. The primary discs 172 and secondary discs 176 are separate pieces formed from either rubber or metal. The primary discs 172 are mounted laterally across the shaft 182 between secondary discs 176 and separated by spacers 175. The primary discs 172 are mounted laterally across shaft 184 and aligned with secondary discs 176 on shaft 182. In turn, the secondary discs 176 on shaft 184 are aligned with primary discs 172 on shaft 182.

The different sizes and alignment of the discs on the adjacent shafts 182 and 184 create a stair-step shaped spacing laterally between the discs on the two shafts. Different spacing between the primary discs 172 and secondary discs 176, as well as the size and shapes of the primary and secondary discs, can be varied according to the types of materials being separated.

For example, the dual diameter disc system shown in FIGS. 6-8 can be used in separation screen 46 in FIG. 2. The distance between adjacent compound discs 170 in FIG. 8, or the distance between the primary and secondary discs 176 and 172 in FIG. 8, are selected in combination with the distance between shafts 182 and 184 to form openings 190. The spaces or openings 190 are sized to allow the containers 50 in FIG. 2 to drop through the screen 46 while other relatively flat and wide fiber material is carried up the screen 46 and dropped onto conveyer 54. In one embodiment, openings 190 are 2"×2" but other dimensions may also be used.

The compound discs shown in FIGS. 7 and 8 can also be used in the screen 14 shown in FIG. 1 to prescreen the MSW material prior to being fed into the air separator 12. The openings 190 for prescreen 14 in FIG. 1 is a 2" minus which has a different dimension than 2"×2". The size of openings in prescreen 14 can vary according to the market for the fines material which can differ according to region.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A separation system for separating recyclable materials from Municipal Solid Waste (MSW), comprising:
    an air separator configured to receive the MSW including recyclable MSW items and other heavier MSW materials, the recyclable MSW items including different combinations of non-shredded paper, non-shredded cardboard, non-shredded plastic containers, or non-shredded metal containers, the air separator further comprising:
        an elongated air chamber including a first opening at a first end configured to receive the MSW dropped into the air chamber and a second opening at a second opposite end;
        a first conveyor located at least partially within the air chamber and having a conveying direction oriented along the air chamber; and
        a fan configured to blow the recyclable MSW items dropped into the first opening in the air chamber in an upward diagonal direction up into the air chamber so that at least some of the recyclable MSW items land on the first conveyor as the first conveyor conveys the at least some of the recyclable MSW items out through the second opening at the opposite end of the air chamber while most of the other heavier MSW materials drop down from the first end of the air chamber, through a third opening in the air chamber; and
    a rotating drum located above the third opening in the chamber, wherein the fan blows the at least some of the recyclable MSW items up over the rotating drum and through the air chamber while at least some of the other heavier MSW materials drop vertically downward through the third opening.

2. The separation system according to claim 1 wherein an axis of rotation of the rotating drum is oriented substantially perpendicular to the upward diagonal direction.

3. The separation system according to claim 1 including a separation screen configured to receive the recyclable MSW items from the second opening in the air chamber, the separation screen further configured to cause the non-shredded plastic containers or non-shredded metal containers to fall between discs in the separation screen while carrying the non-shredded paper or non-shredded cardboard over a top end of the separation screen so that the non-shredded paper or non-shredded cardboard are substantially separated from the non-shredded plastic containers or non-shredded metal containers.

4. The separation system according to claim 3 wherein the separation screen is inclined so that at least some of the non-shredded plastic containers or non-shredded metal containers roll back off a bottom end when the recyclable MSW items are dropped by the first conveyer onto the separation screen.

5. The separation system according to claim 1 further comprising a pre-separation screen configured to remove a first group of smaller items from the MSW prior to dropping the remaining MSW into the first opening in the air chamber.

6. The separation system according to claim 3 wherein the separation screen includes:
    a first set of compound discs mounted on a first set of shafts having primary discs and smaller secondary discs located on sides of the primary discs;
    a second set of shafts located in between the first set of shafts; and
    a second set of compound discs mounted on the second set of shafts also having primary discs and smaller secondary discs located on the sides of the primary discs;
    wherein the first set of compound discs on the first set of shafts are aligned with the second set of compound discs on the second set of shafts such that the first set of compound discs at least partially overlaps with the second set of compound discs.

7. The separation system according to claim 6 where the first and second set of compound discs are arranged to form the openings that allow the non-shredded plastic or non-shredded metal containers to drop off of a back end of the separation screen or through the separation screen while the non-shredded paper or non-shredded cardboard are carried up and over the top end of the separation screen.

8. The separation system according to claim 1 including a bag opener that automatically opens up bags containing the MSW and deposits the MSW onto a conveyor that either directly or indirectly drops the MSW into the air separator.

9. The separation system according to claim 8 wherein the bag opener includes:
    a first cylinder having a first set of fins that protrude from an outside surface and hook a first location on a bag;
    a second cylinder having a second set of fins that protrude from the outside surface and hook a second location on the bag; and
    one or more motors that rotate the first and second set of fins in opposite directions and rotate the first cylinder at a slower speed than the second cylinder so that the second set of fins pull the second location of the bag apart from the first location thereby tearing the bag open and allowing the MSW inside the bag to fall out.

10. A method for separating recyclable materials from Municipal Solid Waste (MSW), comprising: receiving the MSW that includes a first group of MSW and a second group of MSW, wherein the first group of MSW includes different combinations of non-shredded paper, non-shredded cardboard, non-shredded plastic containers, or non-shredded metal containers that are generally recycled into other products that are made from similar types of materials as materials used for making the first group of MSW, wherein the second group of MSW generally includes different combination of other non-shredded MSW waste that generally has a heavier weight and/or a different surface area than the first group of MSW; blowing air into the MSW in an upward and forward direction as the MSW is being dropped into a first opening so that the first group of MSW is blown in the upward and forward direction over a chute and into an air chamber, wherein a majority of the first group of MSW is either blown through the chamber out through a second opening in the air chamber or dropped down onto a first conveyor that carries the first group of MSW out through the second opening; blowing the air diagonally up into the MSW as the MSW is being dropped into the air chamber so that the first group of MSW is blown onto the first conveyor or blown out through the second opening, wherein at least some of the second group of MSW that is heavier or has a different surface area than the first group of MSW is allowed to drop vertically downward from the first opening through the blowing air and into the chute separating the at least some of the second group of MSW from the first group of MSW; moving the first group of MSW that have been separated from the second group of MSW along the first conveyor and dropping the first group of MSW out of the second opening onto a separation screen; and sorting the non-shredded plastic containers or non-shredded metal containers from relatively flat non-shredded paper or non-shredded cardboard in the first group of MSW that has been separated from the second group of MSW.

11. The method according to claim 10 further comprising: carrying the MSW over a pre-screen that causes smaller MSW to drop through discs in the pre-screen while larger MSW is carried over an end of the pre-screen; and dropping the MSW that does not drop through the discs off the end of the pre-screen into the first opening in the air chamber.

12. The method according to claim 10 wherein food and other less aerodynamic residential or business waste in the MSW continues to drop vertically downward into the chute while other more aerodynamically shaped MSW that includes the first group of MSW is blown over the chute.

13. The method according to claim 10 wherein the first group of MSW is blown up over an outside surface of a drum and into the air chamber at the same time that the drum is being rotated to promote the movement of the first group of MSW up into the air chamber.

14. The method according to claim 10 including: receiving the MSW in bags; dropping the bags against a catch mechanism that hooks onto a first portion of the bags and presents the bags to pull fins attached to a cylinder; rotating the cylinder causing the pull fins to hook onto a second portion of the bags spaced from the first portion; further rotating the cylinder causing the pull fins to move away from the catch mechanism pulling apart the first and second portions of the bags a sufficient amount to tear the bags open and cause the MSW inside the bags to empty out; and dropping at least some of the MSW emptied from the bags into the air chamber, wherein the blown air separates the recyclable MSW items from the other heavier non-recyclable MSW.

15. The method according to claim 10 further comprising:
moving the first group of MSW up the separation screen so that the non-shredded plastic containers or non-shredded metal containers drop off of a back end of the separation screen while the non-shredded paper or non-shredded cardboard is carried over a top end of the separation screen substantially separating the non-shredded paper or non-shredded cardboard from the non-shredded plastic containers or non-shredded metal containers;
arranging a plurality of discs in the separation screen to form the openings that cause other non-shredded plastic containers or non-shredded metal containers to drop through the openings while being carried up the separation screen; and
arranging the plurality of discs so that the non-shredded paper or non-shredded cardboard having relatively thin and flat shapes are carried by the plurality of discs over the openings and up and over a top end of the separation screen.

16. A separation system, comprising:
a bag opener including:
a first cylinder having a first set of fins that protrude from an outside surface and hook a first location on a bag;
a second cylinder having a second set of fins that protrude from the outside surface and hook a second location on the bag; and
one or more motors that rotate the first and second set of fins in opposite directions and rotate the first cylinder at a slower speed than the second cylinder so that the second set of fins pull the second location of the bag apart from the first location thereby tearing the bag open and allowing Municipal Solid Waste (MSW) inside the bag to fall out;
an elongated air chamber including a first opening at a first end configured to receive the MSW, the MSW including:
a first group of substantially non-shredded MSW having different combinations of substantially non-shredded paper, non-shredded cardboard, non-shredded plastic containers, or non-shredded metal containers; and
a second group of MSW having heavier weight or different surface areas than the first group of substantially non-shredded MSW;
a first conveyor located at least partially within the air chamber and having a conveying direction oriented along the air chamber; and
a fan configured to:
blow air in an upward direction into the first and second group of MSW dropped into the first opening;
blow the first group of substantially non-shredded MSW over a chute onto different locations on the first conveyer or blow the first group of substantially non-shredded MSW out a second opening at an opposite second end of the air chamber; and
enable the second group of the MSW having the heavier weight or different surface areas than the first group of substantially non-shredded MSW to drop downward from the first end of the air chamber, through the air blown by the fan, and into the chute.

17. The separation system according to claim 16 further comprising a drum located above the chute, wherein the fan creates an air flow that promotes movement of most of the first group of substantially non-shredded MSW up over the drum and through the air chamber while the second group of MSW drops downward past the drum, through the chute, and onto a second conveyor, wherein an axis of rotation of the drum is oriented substantially perpendicular to the upward direction of the air.

18. The separation system according to claim 16 wherein the MSW comprises waste retrieved from residential and office trash containers and bins.

19. The separation system according to claim 16 wherein the first group of substantially non-shredded MSW includes different combinations of newspaper, junk mail, office paper products, cardboard, plastic bottles, jugs, plastic containers, or metal containers.

20. The separation system according to claim 19 wherein the second group of MSW includes different combinations of rocks, concrete, food waste, wood, or other materials that generally have a different weight or surface area than the first group of substantially non-shredded MSW.

21. The separation system according to claim 16 wherein:
the fan is configured to generate enough airflow to carry the first group of substantially non-shredded MSW up into the air chamber and over the chute;
the first group of substantially non-shredded MSW includes relatively light recyclable items used for making new products that use a same material as the first group of substantially non-shredded MSW;
the second group of MSW includes different combinations of rocks, concrete, food waste, wood, or other materials that generally are not used for making new products that use the same material as the first group of substantially non-shredded MSW; and the airflow generated by the fan is insufficient to carry the second group of MSW over the chute and into the air chamber allowing the second group of MSW to drop down through the airflow into the chute.

22. The method according to claim 10 wherein the MSW comprises waste typically retrieved from residential and office trash containers or bins including different combinations of newspaper, junk mail, office paper products, cardboard, plastic bottles, jugs, plastic containers, metal containers, rocks, concrete, food waste, or wood.

23. A system for separating materials, comprising: an air chamber including an inlet, a first outlet, and a second outlet, wherein the air chamber is configured to receive a mixture of Municipal Solid Waste (MSW) and recyclable materials via the inlet; an air blower configured to generate an air flow towards the mixture of MSW and recyclable materials in a generally upward diagonal direction as the mixture of MSW and recyclable materials is being dropped into the air chamber from the inlet; a conveyor having a conveying direction oriented along the air chamber in a general direction of the air flow; and a rotating drum including an axis of rotation oriented substantially perpendicular to the generally upward direction of the air flow, wherein the recyclable materials, being relatively lighter than the MSW, is blown up and over the rotating drum onto the conveyor and out the air chamber via the first outlet, and wherein the MSW falls in a substantially vertical downward direction and out of the air chamber via the second outlet without passing over the rotating drum thereby separating the recyclable materials from the MSW.

* * * * *